No. 885,603. PATENTED APR. 21, 1908.
E. GELIUS.
STONE SAW.
APPLICATION FILED JULY 31, 1905.
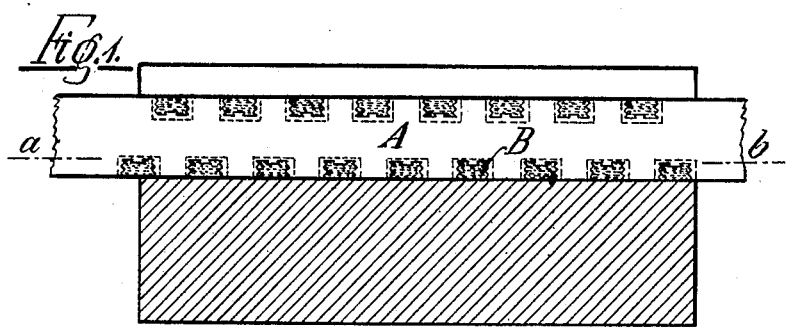
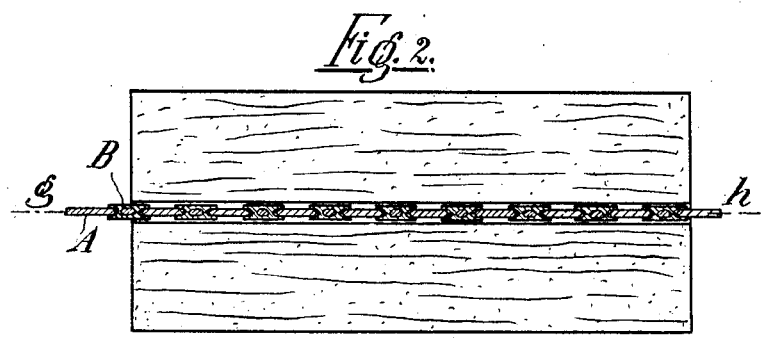
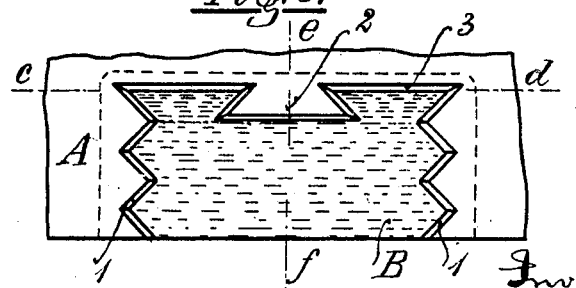
Witnesses:
E. O. Hildebrand
M. F. Anderson
Inventor:
Edward Gelius
by George Massie
attorney
THE NORRIS PETERS CO., WASHINGTON, D. C.

UNITED STATES PATENT OFFICE.

EDUARD GELIUS, OF REHAU, GERMANY.

STONE-SAW.

No. 885,603.  Specification of Letters Patent.  Patented April 21, 1908.

Application filed July 31, 1905. Serial No. 271,940.

*To all whom it may concern:*

Be it known that I, EDUARD GELIUS, a citizen of the Empire of Germany, residing at Rehau, in the Empire of Germany, have invented a new and useful Stone-Saw, of which the following is a specification.

My invention relates to improvements in stone saws, whereby the life of the saw is lengthened and the saw is rendered suitable for sawing both hard and soft stones, while its wear and tear is considerably reduced; and the objects of my improvement are, first, to make the saw blade of soft steel and to provide it in the one edge or in both edges with a plurality of cuts of a peculiar shape; and, second, to provide the saw blade with a corresponding plurality of teeth of equal or a greater thickness, which are made of hard steel and engage in the cuts of the blade.

I attain these objects by the stone saw illustrated in the accompanying drawing, in which—

Figure 1 is an elevation of a part of the stone saw and a vertical section through a stone which is being sawed, Fig. 2 is a horizontal section through this stone saw on the line *a—b* in Fig. 1 and a plan of the stone, Fig. 3 is a horizontal section through the line *c—d* in Fig. 5, Fig. 4 is a vertical section through the line *e—f* in Fig. 5, and Fig. 5 is an elevation on an enlarged scale of one of the peculiar cuts in the stone saw and a vertical longitudinal section through the tooth.

Similar letters of reference refer to similar parts throughout the several views.

According to my invention the stone saw comprises a blade A of soft steel and a plurality of teeth B of toughened cast-iron or chilled or case-hardened cast steel, which may be arranged either on the one edge alone or on both edges. Fig. 1 shows a stone saw with teeth B on both edges, so that first the teeth on the lower edge may be used for cutting stones and afterwards, when they are worn out, the teeth on the upper edge may be used, the blade being of course turned.

The saw blade A of soft steel is made of a uniform thickness and is provided in its one edge or in its two edges, as the case may be, with a plurality of cuts of the peculiar shape shown at Fig. 5. These cuts may be produced in any known manner, be it by cutting out in a press or otherwise. They have each two serrated sides 1, 1 and a bottom 3 parallel to the edge with a dovetailed projection 2. Preferably the edges of the two sides 1, 1, the bottom 3 and the projection 2 are sharpened or beveled off in the manner clearly shown at Figs. 3 to 5. The teeth B are rectangular and made of a greater thickness than the blade A. They are formed by inserting the blade A in suitable molds and filling up the spaces with the melted metal. The molds may be of iron, but the essential point is, that the teeth B be made of toughened cast-iron or of chilled or case-hardened steel, in other words, they must be harder than the saw blade A. After filling up the spaces the stone saw is ready for use. When the stone saw A is provided on both sides with teeth B, the latter are preferably made to alternate one with the other, as is shown at Fig. 1.

The serrations in the sides 1, 1 and the dovetailed projection 2 in the bottom of each cut will prevent the tooth B from getting loose, the more so, as their edges are sharpened or beveled off, so that the tooth is also prevented from shifting in the cross direction.

As is clearly shown at Figs. 1 to 3, all the teeth B project a little from the saw blade A on both sides, so that they produce during the sawing operation the necessary spaces for the grinding material, such as sand or the like. On the top and bottom faces the teeth B are made to flush with the edges of the saw blade A.

The new stone saw produces clean cuts in the stones. It is cheap and its wear is considerably reduced by the hard teeth.

The stone saw described so far may be varied without departing from the spirit of my invention, as, for instance, the blade A and the teeth B, being of unequal hardness, may be made originally of substantially the same thickness and yet carry a considerable degree of efficiency in practical operation.

What I claim as my invention, and desire to secure by Letters Patent, is—

1. In a stone saw, the combination, with a blade of substantially uniform thickness and made of soft steel and provided in either edge with a plurality of cuts, of a plurality of hard steel teeth of a greater thickness cast into and filling the cuts of said blade and projecting slightly on both sides.

2. In a stone saw, the combination, with a blade of soft steel of substantially uniform thickness and provided in either edge with a plurality of cuts having a serrated outline, of cutting teeth of a greater thickness than the blade formed of hard steel cast into and filling the cuts of said blade flush with the lower edge and projecting slightly on both sides.

3. In a stone saw, the combination, with a soft steel blade of substantially uniform thickness provided in either edge with a plurality of cuts having a serrated outline, the saw blade at the boundary of said cuts being beveled, of a plurality of cutting teeth so cast in the serrated cuts of said blade as to completely fill the same and be flush with the lower edge while projecting slightly on both sides.

4. In a stone saw, the combination, with a soft steel blade of substantially uniform thickness provided in either edge with a plurality of cuts having serrated sides and a dovetail bottom, the blade forming the boundary of the cuts being beveled, of a plurality of hard steel cutting teeth of corresponding outline and grooved edges formed by casting the metal in the cuts so as to completely fill the same and be flush with the lower edge and project slightly on both sides.

In testimony whereof I have signed my name to this specification in the presence of two subscribing witnesses.

EDUARD GELIUS.

Witnesses:
G. BARDEL,
H. BARDEL.